Sept. 27, 1938.  L. C. LAY  2,131,379
VISCOMETER
Filed June 16, 1934   5 Sheets-Sheet 1

INVENTOR
LAURENCE C. LAY
BY Edward R. Inman
ATTORNEY

Sept. 27, 1938.   L. C. LAY   2,131,379
VISCOMETER
Filed June 16, 1934   5 Sheets-Sheet 2

INVENTOR
LAURENCE C. LAY
BY Edward R Inman
ATTORNEY

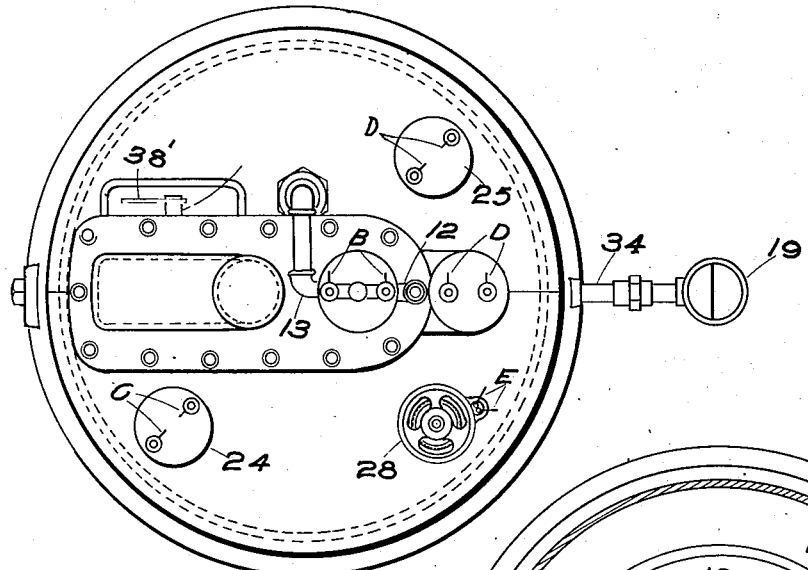
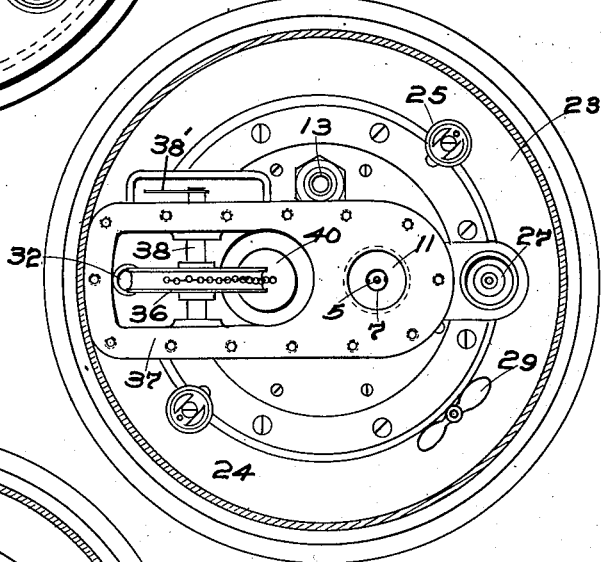
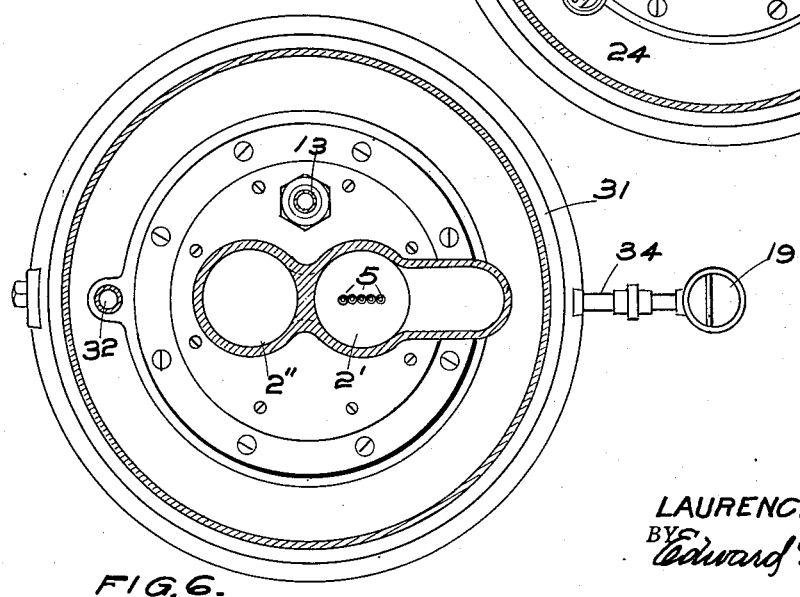

Sept. 27, 1938.                L. C. LAY                2,131,379
                              VISCOMETER
                         Filed June 16, 1934            5 Sheets-Sheet 4

INVENTOR
LAURENCE C. LAY
BY
Edward R. Inman
ATTORNEY

Patented Sept. 27, 1938

2,131,379

UNITED STATES PATENT OFFICE 2,131,379

VISCOMETER

Laurence C. Lay, Oil City, Pa.

Application June 16, 1934, Serial No. 730,922

7 Claims. (Cl. 265—11)

This invention relates to a viscometer adapted to indicate the viscosity of liquids and to be continuously operative for the purposes of determining and co-incidentally indicating the viscosity of a quantity of liquid materially in excess of the quantity which can be tested in a corresponding interval of time by means of the viscometers now generally used and designated as "Standard" by the American Society for Testing Materials, headquarters at 1315 Spruce Street, Philadelphia, Pa. The instant invention is adapted to give results, as to viscosity, identical with those attained through the instrumentality of said standard viscometers. The particular inventive concept herein disclosed, and practicable embodiment specifically set forth, resides in the combination, or co-ordination of a liquid chamber termed the viscometer chamber provided with an inlet for the liquid to be tested and an outlet from said chamber adapted for the viscometric flow of liquid therethrough from said viscometer chamber into a sub-chamber, the relative areas of said inlet and said outlet being such that, in the continuous operation of the instrument, a depth or head of liquid is built up in said viscometer chamber and is continuously indicated therein in terms of standard viscosity, which is prescribed by said Society for Testing Materials; additional means are employed for maintaining a continuous supply of the liquid to be tested within said viscometer chamber, together with means for maintaining a predetermined temperature of the liquid within said viscometer chamber.

The main object of this invention is, to produce a viscometer of simple construction through which a sample of a liquid being produced, may be continuously bypassed, either during the process of manufacture and compounding, or as it is being passed from the manufacturing stage into storage or shipping containers.

Another object is, to provide a viscometer unit which is readily adapted to be combined with other instruments, for the automatic control of the various factors, such as temperature, pressure, etc., which may effect the operation of the viscometer and of the results produced thereby, whereby substantially absolute results and readings may be attained.

Another object is, to provide a viscometer which is well adapted to be operated in conjunction with and connected to remotely positioned instruments for visually indicating and graphically recording at a distance the indicia, or informative matter which the viscometer is adapted to determine and supply. Said visually indicating and graphically recording instruments may be either novel forms or any suitable commercial type, those shown in the drawings being merely illustrative, but will be hereinafter more positively designated for the sake of clearness.

In the manufacturing industries in which large bodies of fluid must be tested, and especially in the refining of petroleum oils, it is desirable, in order to insure uniformity of product, to test bypassed samples of large quantities of oil in the course of its production, either as the oil comes from stills, or as it is produced in compounding plants, but the well known viscometers which are largely of the laboratory type, are far too slow in their operation to permit their use in determining the viscosity of oil in sufficient quantities or at such short intervals as to insure the desired degree of uniformity of the whole product of a large plant.

Inasmuch as the "universal outlet tube" of a viscometer is the time and quantity-limiting factor of the usual viscometer, I have conceived the idea of producing a viscometer with a sufficient number of tubes, the caliber and length of each of which conforms closely to the caliber and length of said universal outlet tube, whereby its capacity will be increased in the ratio of 1 to the number of tubes which my inventive idea contemplates, and this, together with the selection, combination, proper relative arrangement and coordination of the other factors common to the art of viscometry, constitute the gist of my inventive idea; I have, therefore, included herein other coordinated factors which when combined with my improved viscometer as illustrated, and in the manner herein described, I believe to have the requisite qualities of invention.

Inasmuch as this specification is addressed to those skilled in the art of viscometry, and more particularly to those skilled in determining the viscosity of lubricating oils, for which, among other uses, my improved viscometer is especially well adapted, reference is made to the publication Lubrication and Lubricants, Archbutt and Deeley, 1927 ed., pages 188 to 193, Griffin & Co., publishers. Reference is also made to the publication: American Society for Testing Materials, Report of Committee D-2, Standard Methods of Test, A. S. T. M. Designation D 88-00, page 254, 1932.

In the matter referred to, full particulars relating to the construction and operation of the various well known commercial viscometers may be found, together with Poiseuille's formula, and such corrections as should be applied in the use of this formula, or may be necessary to the attainment of substantially accurate results due to abnormal conditions met with in specific cases.

The construction of my improved viscometer is clearly illustrated in the accompanying drawings, both as a unit,—its simplest form—in which it may be used for many commercial purposes, and in combination with other accessories such as may be necessary in the attainment of substantially absolute results.

Referring to the drawings:

Fig. 4 is a plan view of Fig. 3.

Fig. 5 is a plan view of the Fig. 3 form, with the cover section of same removed.

Fig. 6 is a transverse section taken on line VI—VI of Fig. 3.

Figure 1:
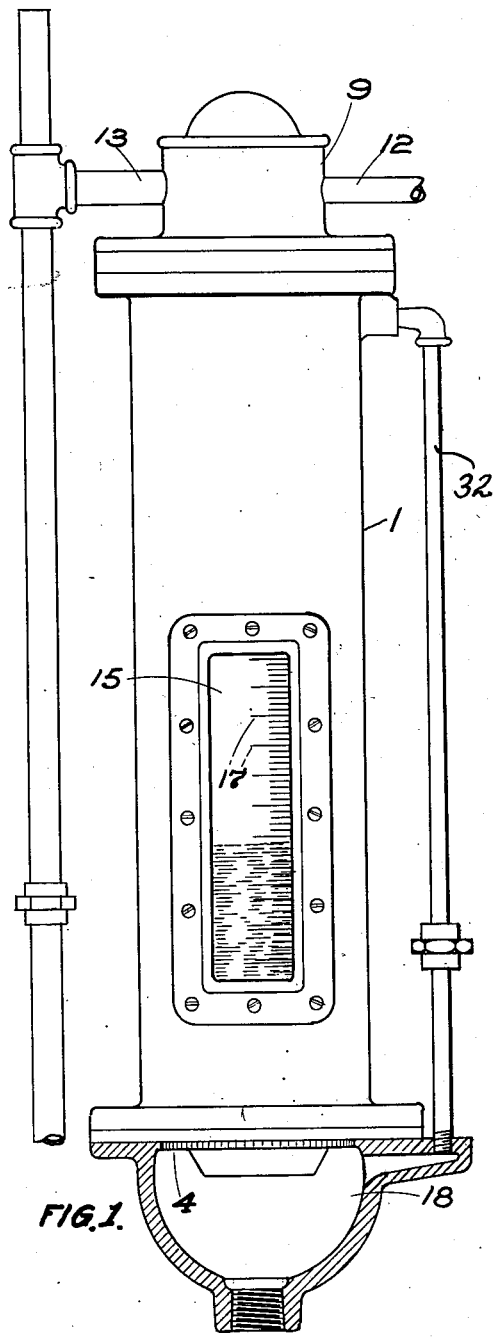
Fig. 1 is a side elevation of the viscometer unit with the bottom portion, which constitutes the outlet chamber, shown in central, vertical section.
Figure 2:
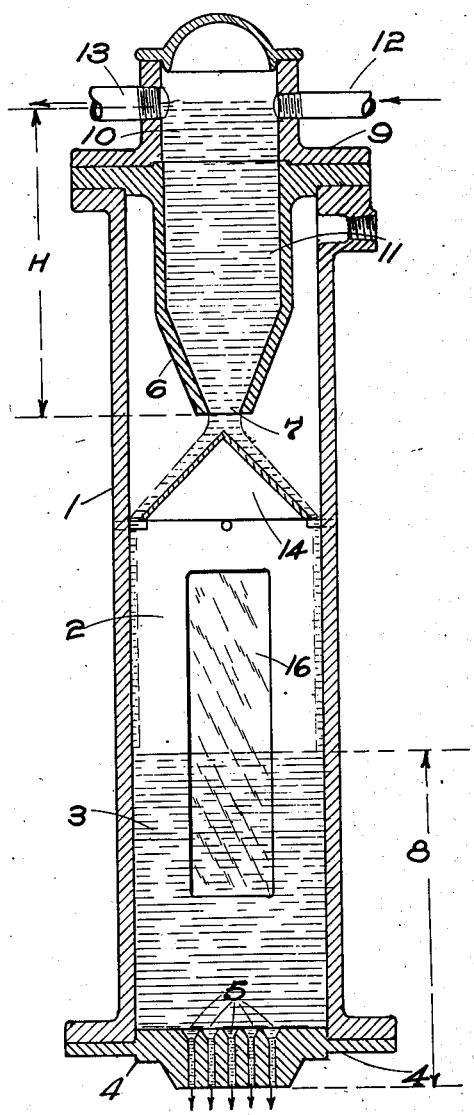
Fig. 2 is a central, vertical section of Fig. 1, the outlet chamber being omitted; this form is termed the commercial form.

Referring to Figs. 1 and 2 of the drawings, the viscometer unit here shown consists of a cylindrical, tubular reservoir 1, having comparatively thin walls; the viscometer chamber 2 of this reservoir is adapted to contain the liquid to be tested, which liquid is indicated by the numeral 3; said chamber 2 is of sufficient vertical extent as to adapt that portion of same above the surface of said contained liquid, to be utilized as an air chamber, as and for a purpose which will presently appear. The bottom of said reservoir is supplied with a tube plate 4 which is provided with a plurality of universal viscometric tubes 5; it is intended that these tubes shall conform in diameter and length to the dimensions prescribed by the U. S. Bureau of Standards. Reference is made to the publication by American Society for Testing Materials, "Standard Method of Test for Viscosity of Petroleum Products and Lubricants" which bears the designation "88–33", and especially to the illustration upon page 2 of that publication, and to the feature of that illustration which is designated "Universal outlet tube".

The upper end of said reservoir is supplied with an inlet nozzle or chamber 6, the outlet orifice 7 at the bottom of which, should have an area which bears a certain fixed relation to the combined fixed area of the tubes 5 so that a fairly constant,—though necessarily variable—head 8 shall be maintained above the lower end of said tubes 5; the area of orifice 7 in nozzle 6 bears such coordinative proportion to the combined area of the viscosity tubes 5 that, upon account of the head H of fluid within said nozzle, a head 8 of liquid is maintained within chamber 2 which latter head is variable according to the degree of viscosity of the liquid being tested. Said nozzle 6 is of smaller external diameter than the internal diameter of reservoir 1 and extends downwardly thereinto for the purpose of shielding same and the liquid therein from the effects of temperature exteriorly to said nozzle. In each of such interchangeable nozzles 6 and plates 4, however, the orifice 7 and tubes 5 respectively, have a fixed and definite caliber.

The upper end of nozzle 6 is supplied with a cap 9 which forms an extension 10 of the chamber 11 of said nozzle; pipe 12 for the inflow of liquid to be tested, leads into one side of said cap, and an overflow pipe 13 which is arranged in horizontal axial alignment with said pipe 12 provides for the overflow of surplus liquid from said inlet nozzle, whereby a positive nonturbulent and constant head H of liquid is provided within said nozzle. At a point below the outlet of said nozzle is placed a baffle having the form of a diverter cone 14, the apex of which is spaced sufficiently below orifice 7 that it will not interfere with the full flow of liquid from said orifice; the base of said cone has a diameter of such size that the area of the annular space between its lower periphery and the adjacent wall of the reservoir is only slightly greater than the area of said orifice 7, and because of this, the liquid flowing from said nozzle is diverted to and flows downward upon the inner wall of said reservoir into the body of liquid 3, whereby turbulence of the body of liquid 3 is avoided, and greater accuracy is thereby attained in the performance of the instrument. As another means of preventing turbulence of the liquid 3 a baffle having the form of a buoyant screen structure 14' which will float freely upon the surface of said liquid, may be employed as shown in Figs. 3 and 7.

Head 8 of the body of liquid 3 indicates, approximately, the viscosity of the liquid being tested, and in order that suitable and convenient visual continuously functioning indication may be had at all times of the height of said head and as one means of supplying such indication, the wall of said reservoir 1 is supplied, at opposite sides with windows 15 and 16, one of which is shown as being calibrated, as at 17, in terms of viscosity.

The construction of this unit is such that various modified forms of orifice plate 4 and nozzle 6 may be interchangeably used in said reservoir 1, one of which modifications may be a variation of the number and caliber of tubes in plate 4, and a corresponding variation of the area of orifice 7 in said nozzle, for the purpose of giving to this unit a possible wider range of utility, greater facility in meeting varying conditions and economy of manufacture. All of the chambers aforesaid are hermetically joined, and means, to be presently set forth, is supplied for the purpose of maintaining an equality of air pressure in the upper portions of said viscometer chamber and sub-chamber. For the purpose of insuring an equalization of air pressure in the air space in the upper portion of the viscometer chamber 2 and the air space above the liquid in the sub-chamber 18, a pressure-equalizing pipe 32 is provided, and forms free communication between the air spaces respectively of said chambers.

Figure 3:
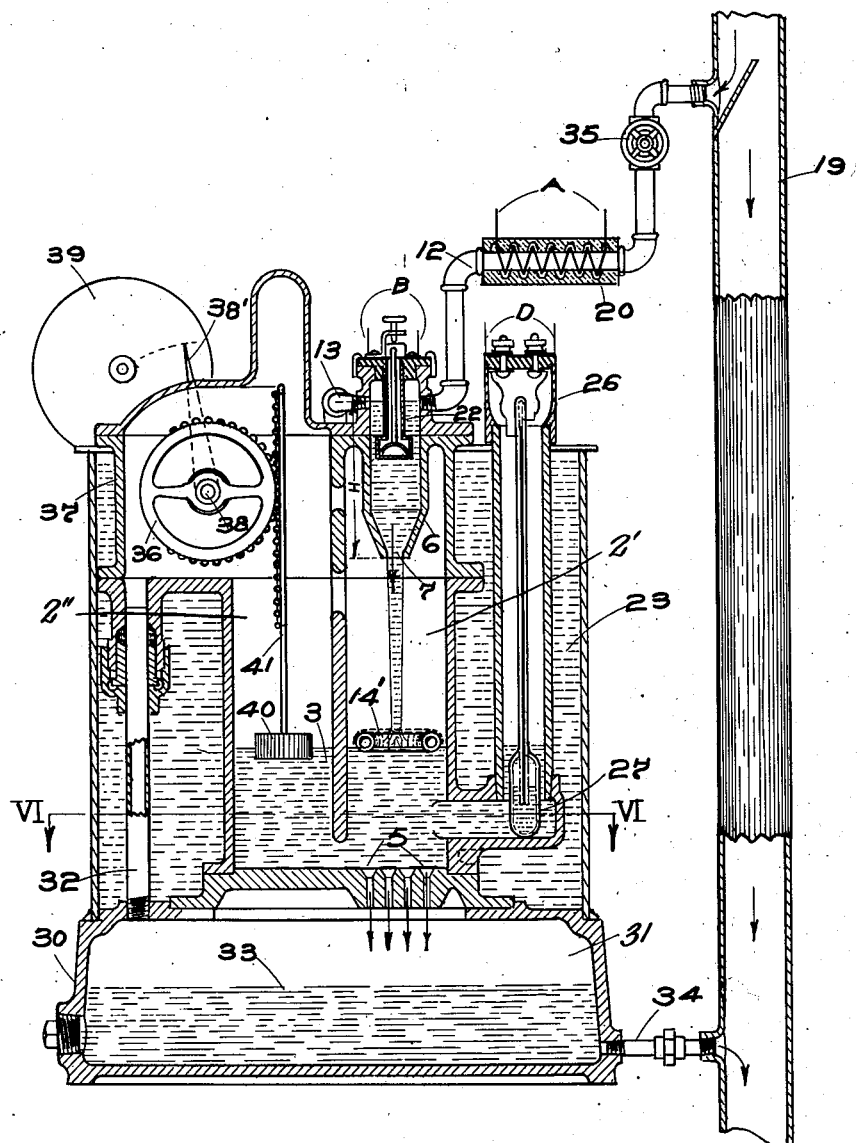
Fig. 3 is a central, vertical section of a modified form of my improved viscometer showing the same equipped with certain accessory appliances which are employed in the attainment of substantially absolute results.
Figure 7:
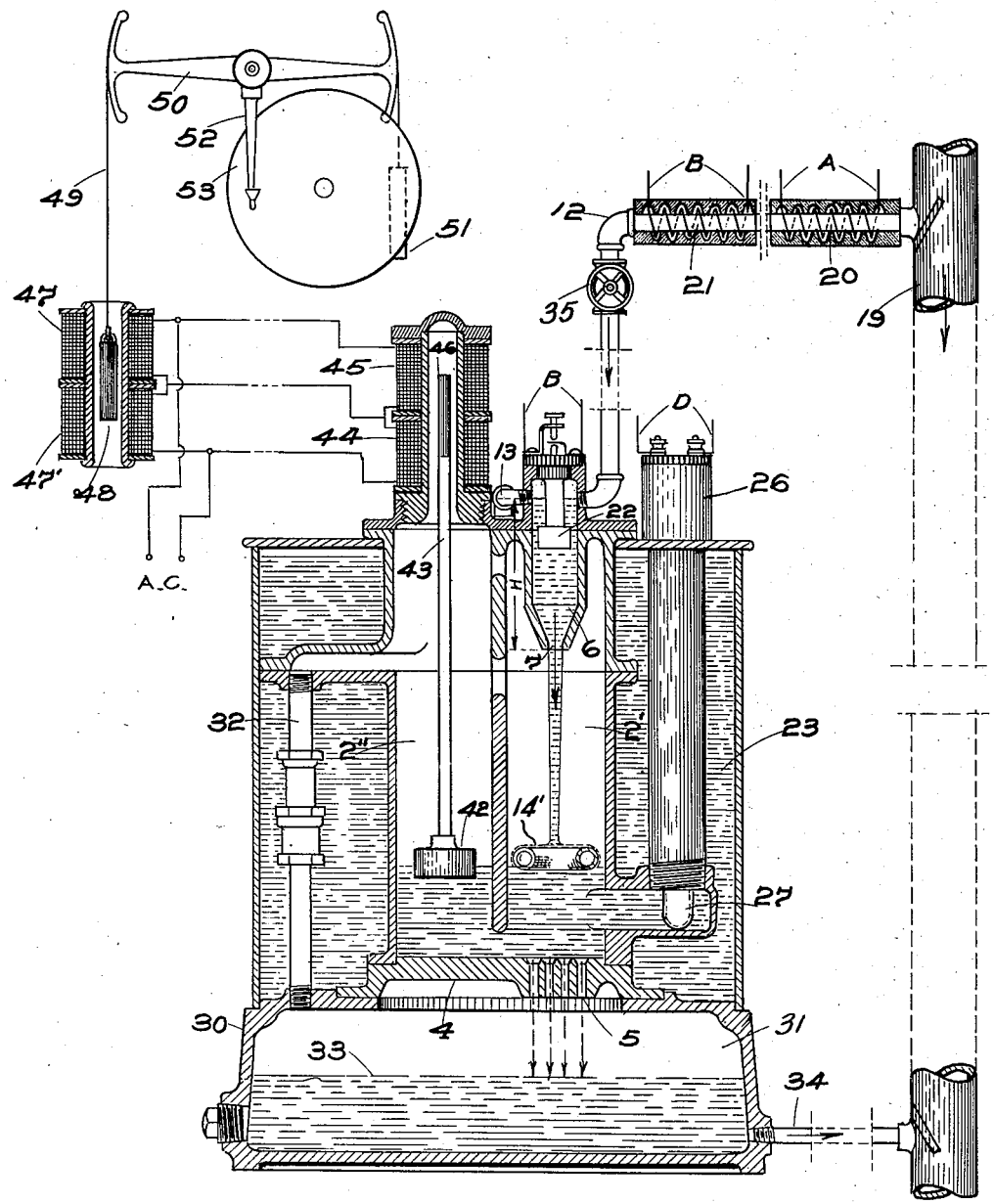
Fig. 7 is a central, vertical section of my improved viscometer organization illustrating a different form of accessory equipment from that shown in Figs. 3, 4 and 5.

Inasmuch as a predetermined, evenly maintained temperature of the sample under test is one of the essentials in the attainment of accurate results in the practice of viscometry, certain heating appliances are provided and may be applied to the pipe 12 of all the forms shown in Fig. 1, Fig. 3 or Fig. 7 which comprise one or more primary heating units arranged to heat the sample of liquid as it is bypassed from the main body of liquid to the viscometer reservoir or chamber; also one or more secondary electrical immersion heating units immersed within the bath 23 contained in a thermo-tank which surrounds the viscometer chamber. Said immersion heater units may be as readily applied to the Fig. 1 form of viscometer as to the Fig. 3 and Fig. 7 form in cases where a water bath is necessary; but in many cases, where the instrument is located in a room of normally warm temperature, a water bath is not needed,—in both the Fig. 3 and the Fig. 7 construction; the organizations shown in these views being identical in all respects except the respective indicating devices.

Figure 8:
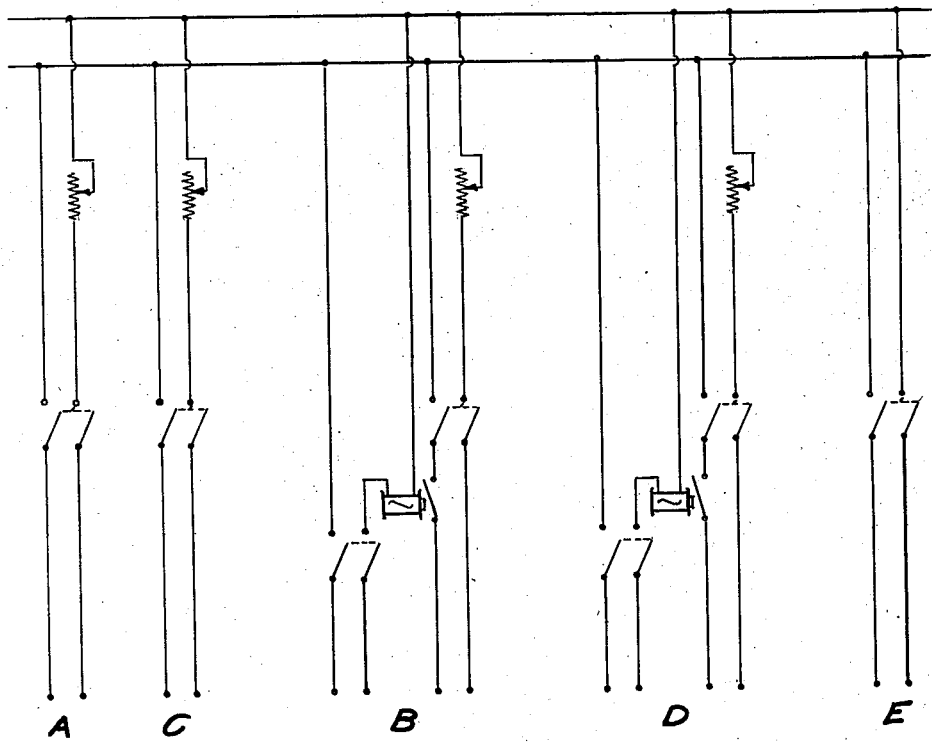
Fig. 8 is a schematic illustration of the electrical wiring used with the accessory equipment illustrated in Figs. 3 and 7.

Said primary heating units are indicated in Fig. 7 as 20 and 21. The unit 20 is adapted to maintain a constant temperature, the electrical circuit for which is indicated in Fig. 8 by the reference character A; the heater 21 is thermostatically controlled by means of the thermostat 22 in the upper end of the extension chamber 10 of the entrance nozzle 11; the electrical wiring for said heater 21 is indicated by the reference letter B, in Fig. 8; the immersion heaters for the bath 23 are shown at 24 and 25, the unit 24 being a constantly heated unit, the circuit for which is indicated at C in Fig. 8; the unit 25 is thermostatically controlled by means of the vapor expansion thermostat 26, the bulb 27 of which is immersed in the liquid 3 in the chamber 2'; the wiring for said unit 25 is indicated in Fig. 8 by the reference letter D. Another electrically operated factor is a motor 28, which is indicated as being of the vertical type, the lower end of the shaft of which is immersed within the bath liquid and is provided with an agitating member 29,—Fig. 5—adapted to cause a circulation of the bath liquid, whereby an even temperature through the body of this liquid is maintained; the wiring for this motor is indicated by the reference letter E.

Said reference letters A, B, C, D and E, are applied in Fig. 4 to the terminals of the various factors to which they respectively relate.

In the circuits, B and D are so interposed as to cause the circuits to be broken at a certain maximum of temperature. It will be readily noted that the viscometer structures shown in Figs. 1 and 2, 3 and 7 are substantially identical in all essential details as to their viscometric functions and this, notwithstanding the fact that their respective indicative devices differ in form, though not in function, and the further fact that baffle structures 14 and 14' differ in form, but perform identical functions.

The base 30 of the viscometer organization comprises a low pressure sub-chamber 31 into which the liquid is gathered as it flows from the tubes 5. Said chamber serves a plurality of purposes, one of which is the maintenance of a uniform temperature upon both sides of the orifice plate 4, as well as uniformity of other atmospheric conditions, when this viscometer is used in unprotected or unsheltered locations; another object is the maintenance of equality of pressure both above and below the body 3 of liquid which is upon said plate 4; as one means of attaining said uniformity of pressure, an air pressure equalizing pipe 32 leads from any suitable air containing portion of the chamber as 2' or 2", above the body of liquid 3 therein, into the upper portion of sub-chamber 31 above the body of liquid 33 in said chamber 31. Liquid flows from chamber 31 through pipe 34 back into the main conduit 19, and because of this return of the tested liquid to its relatively original source, it will be readily understood that the tested sample is merely bypassed from a main larger body of the liquid under test, and because of this, the viscometer is substantially automatic, and may be continuous in operation. The quantity of liquid which flows through pipe 12 and through base 30 may be regulated by a suitable valve as 35. From the foregoing description it will be readily understood that the viscometer chamber 2'—2" and the subchamber 31 have no direct communication with the external atmosphere; this arrangement is for the purpose of insuring uniformity of air conditions in respect to temperature in said chambers; for the purpose of insuring equality of air pressure above the liquid in said chambers, they are connected by means of said pressure equalizing pipe 32.

For the purpose of providing indicating means other than that shown at 15 and 16 in Figs. 1 and 2, whereby the results derived by the viscometer may be visually indicated, I have shown in Fig. 3 an indicator consisting of a pulley 36 mounted within the upper portion of the casing 37 which is mounted upon a rotative shaft 38, one end of which extends through the wall of said casing, and carries upon its outer end an indicating hand 38' which is caused to move oscillatively in proximity to a revolving disc 39 which is suitably calibrated to denote the desired information relative to the viscosity of the liquid being tested. The actuation of pulley 36 and its shaft is attained by means of a float 40 which is buoyantly carried upon the liquid 3 of the viscometer chamber 2"; said float is supplied with a vertically extending stem 41 which is connected to and actuates said pulley as the height of fluid 3 varies.

The reason for providing the two chambers 2' and 2" in this form of organization, is to provide a chamber for said float that is shielded from any turbulence which might be caused in the liquid 3 by the falling stream from nozzle 1—Fig. 2—and possibly imparting to said float a vibratory motion that would affect the accuracy of its function. It will be readily noted this form of index is operated by gravity actuation of the float as it is buoyantly caused to rise and fall by a change of level of the liquid 3.

A magnetically actuated visual index is shown in Fig. 7, the prime actuative element of which is also a float 42 buoyantly carried upon the surface of the liquid being tested. Said float is provided with a stem 43 which extends upwardly into the core of an electro-magnetic coil consisting of two units 44 and 45, axially aligned; the upper end of said stem is provided with a magnetic core 46 which is normally positioned midway of the junction of said two units. At any suitable location more or less remote from the viscometer are provided second electro-magnetic coils, 47 and 47', corresponding closely to the coils 44—45 carried by the viscometer; within these last mentioned coils 47 and 47' is positioned a magnetic core 48 in central balanced relation therein; to the upper end of this core is attached a suitable cord 49, or the like, which extends vertically, with its upper end secured to one end of a balanced rocker-arm 50, which is balanced by means of a counterweight 51. Said rocker arm is provided with recording pen 52 adapted to produce the desired record upon a revolving record disc 53 which is calibrated in terms of viscosity. Said disc 53, also the previously mentioned disc 39, and their operating mechanism respectively, may be any of the well known devices of this class, such, for example, as those illustrated upon pages 38 and 39 of Mechanical Catalog published by The Society of Mechanical Engineers, 1933–34 edition.

Both sets of coils, 45 and 46; 47 and 47' are mounted on a non-magnetic metal core. Throughout the specification and claims, it is intended that the designation "continuously-operative, increased volume viscometer" shall mean a viscometer employing an outlet from the viscometry chamber which is adapted to give the same results as to the degree of viscosity of an increased volume of liquid as that produced by the Saybolt Universal viscometer equipped with an "Universal outlet tube" prescribed by the American Society for Testing Materials; said Saybolt viscometer being of the laboratory type suitable only for small samples of material, and is not adapted for use with a much larger volume and constantly changing stream of liquid, such as applicant has disclosed.

Reverting to the form of viscometer shown in Figs. 1 and 2, let it be noted that the structure here shown, is in all essential points suitable to measure the viscosity of liquids and to continuously indicate the viscosity so determined; however, it is not suitable for use except in places that are maintained at an approximately regular and fairly warm temperature, as above 80 degrees F.

In respect to the constructions shown in Figs. 3 and 7, the only difference between these two forms is found in the indicating mechanism, and such slight changes in design of the upper or nozzle chamber section as the gravity equipment of Fig. 3 and the magnetic indicating equipment of Fig. 7 requires, respectively; in this respect, let it be noted that Fig. 6 would be the same if the section were taken at the same location of Fig. 7 that is indicated by the line VI—VI of Fig. 3.

I claim the following:

1. In a viscometer adapted for continuous operation in the practice of the technical art of viscometry an organization for use with liquids, which embodies in combination, a sub-chamber, a viscometer chamber and an inlet chamber which are superposed and connected together in the order stated, all of said chambers being closed to the atmosphere, the lower end of said inlet chamber being formed into a nozzle which extends downwardly into said viscometer chamber and is provided at its lower end with an outlet orifice for the passage of liquid therefrom into said viscometer chamber, a turbulence-reducing means interposed in the line of flow of the liquid into said viscometer chamber, a plurality of universal viscometric tubes of fixed area extending through the bottom of said viscometer chamber through which liquid flows into said sub-chamber, a liquid-supply conduit through which liquid is supplied from a source of liquid to be tested and flows continuously throughout the period of test into said inlet chamber, an overflow conduit through which a surplus of liquid flows from said inlet chamber into said sub-chamber, a conduit from which a surplus of liquid flows from said sub-chamber; the area of said outlet orifice and the combined fixed cross sectional area of said plurality of tubes bearing such co-ordinative relation to each other as to maintain a head of liquid within said viscometer chamber, which head is indicative of the viscosity of the liquid therein, and means visually indicative of the height of said head.

2. In a continuously-operative, increased-volume viscometer, an organization comprising in combination, a reservoir adapted for the reception of liquid to be tested, the bottom of said reservoir being provided with universal viscosity tubes extending therethrough, a liquid-supply nozzle positioned at the upper end of said reservoir provided with an orifice at its lower end for the discharge of liquid into said reservoir, the area of which nozzle orifice bears such relative, co-ordinative proportion to the combined cross-sectional areas of the tubes in the bottom of said reservoir that, because of the constantly maintained head of liquid within said nozzle, a head of liquid is built up in said reservoir which is variable according to the degree of viscosity of the liquid being tested, a sample-liquid supply pipe leading into the upper portion of the chamber of said nozzle, an over-flow pipe leading from the upper portion of said nozzle-chamber at a height substantially coincident with the height of said inlet pipe, whereby a head of liquid is insured within said nozzle and a conical baffle positioned within said reservoir with its apex in contiguity to said orifice of said nozzle and the periphery of its base in contiguity to the walls of said reservoir, whereby the inflowing liquid is diverted to and caused to flow downwardly upon said walls.

3. In a continuously-operative, increased-volume viscometer, an organization comprising in combination, a reservoir adapted for the reception of liquid to be tested, the bottom of said reservoir being provided with universal viscosity tubes extending therethrough, a liquid-supply nozzle positioned at the upper end of said reservoir provided with an orifice at its lower end for the discharge of liquid into said reservoir, the area of which nozzle orifice bears such relative, coordinative proportion to the combined cross-sectional areas of the tubes in the bottom of said reservoir that, because of the constantly-maintained head of liquid within said nozzle, a head of liquid is built up in said reservoir which is variable according to the degree of viscosity of the liquid being tested, a sample-liquid supply pipe leading into the upper portion of the chamber of said nozzle, an over-flow pipe leading from the upper portion of said nozzle-chamber at a height substantially coincident with the height of said inlet pipe, whereby a head of liquid is insured within said nozzle, a conical baffle positioned within said reservoir with its apex in contiguity to said orifice of said nozzle and the periphery of its base in contiguity to the walls of said reservoir, whereby the inflowing liquid is diverted to and caused to flow downwardly upon said walls, a sub-chamber positioned below said reservoir for the reception of liquid as it flows from said plurality of tubes, the upper portion of said reservoir, the upper portion of the chamber of said nozzle, and the upper portion of said subchamber each forming an air chamber which is closed to the atmosphere, and a conduit connecting the air chamber of said reservoir with the air chamber of said subchamber whereby equalization of air pressure is insured within said connected chambers.

4. In a continuously-operative, increased-volume viscometer, an organization comprising in combination, a vertically-extending, oblong cylindrical reservoir adapted for the reception of liquid the viscosity of which is to be determined, the bottom of said reservoir being provided with a plurality of universal viscosity tubes extending therethrough, a liquid-supply nozzle positioned at the upper end of said reservoir provided with an orifice at its lower end for the discharge of liquid into said reservoir, the area of which nozzle orifice bears such relative, coordinative proportion to the combined cross sectional areas of the tubes in the bottom of said reservoir that, because of the constantly maintained head of liquid within said nozzle, a head of liquid is built up in said reservoir which is variable according to the degree of viscosity of the liquid being tested, a sample-liquid supply pipe leading into the upper portion of the chamber of said nozzle, an over-flow pipe leading from the upper portion of the chamber of said nozzle at a height substantially level with said inlet pipe, a diverter cone positioned within said reservoir with its apex positioned in proximity to the orifice of said nozzle with the periphery of its base in contiguity to the walls of said reservoir, a sub-chamber positioned below said reservoir into which sub-chamber liquid flows through said tubes from said reservoir wherein and whereby an even temperature and air pressure are maintainable at and adjacent the lower face of said orifice plate, and a suitable passage for free air communication between the upper portion of said reservoir chamber and the upper portion of said sub-chamber, said last mentioned chamber being supplied with a conduit adapted for the outflow of liquid and the return of same to the body of tested liquid.

5. In a continuously-operative, increased volume viscometer, an organization comprising in combination three vertically-aligned, hermetically joined chambers namely, an upper inlet chamber, an intermediate viscometer chamber and a bottom sub-chamber which are adapted for the passage of liquid therethrough, the viscosity of which is to be determined during such passage, said inlet chamber being formed at its lower end into an elongated nozzle which extends downwardly into said viscometer chamber and is provided at said lower end with an outlet orifice communicating with said viscometer chamber, a baffle within the viscometer chamber positioned intermediate the lower end of said nozzle and the surface of the liquid within said chamber, a conduit through which liquid to be tested is introduced into the upper portion of said inlet chamber, means applying automatically controlled heat to said liquid as it flows through said conduit, an overflow conduit leading from the upper portion of said inlet chamber into the upper portion of said subchamber, the bottom wall of said viscometer chamber being provided with universal, tubular viscometric fixed-area outlet communication with the interior of said subchamber the caliber of which outlet communication bears such fixed relative proportion to the caliber of the outlet orifice of said nozzle as to maintain a head of liquid within said viscometer chamber which is variable in accordance with and indicative of the viscosity of said liquid; means adapted to indicate the status of said head in terms of viscosity, said sub-chamber being provided with an outlet conduit whereby liquid is continuously withdrawn from said sub-chamber, a liquid bath in which said viscometer chamber is immersed, and electrically operated immersion heaters in said bath.

6. In apparatus of the kind described, an inlet chamber, a viscometer chamber and a sub-chamber, arranged in superposed relation, the viscometer chamber having one or more discharge outlets communicating with the subchamber, a supply-tube and an overflow-tube communicating with the inlet chamber, a turbulence-reducing means interposed in the flow between said inlet chamber and the viscometer chamber, and a pressure-equalizing passage extending from a point above the surface of the fluid in the viscometer chamber to the subchamber above the normal level of the liquid in the latter.

7. In apparatus of the kind described, an inlet chamber, a viscometer chamber and a sub-chamber, arranged in superposed relation, the viscometer chamber having one or more discharge outlets communicating with the sub-chamber, a supply-tube and an overflow-tube communicating with the upper portion of the inlet chamber with their openings thereinto arranged in horizontal axial alignment, a turbulence-reducing means interposed in the flow between the inlet chamber and the viscometer chamber, and an air-pressure equalizing passage extending from a point above the surface of the fluid in the viscometer chamber to the sub-chamber above the normal level of the liquid in the latter.

LAURENCE C. LAY.